United States Patent
Zohar et al.

(10) Patent No.: US 10,775,472 B2
(45) Date of Patent: Sep. 15, 2020

(54) SYSTEM AND METHOD FOR ENHANCED POINT-TO-POINT DIRECTION FINDING

(71) Applicant: iSeeLoc Inc., San Jose, CA (US)

(72) Inventors: Avi Zohar, Sunnyvale, CA (US); Sharon Zohar, San Jose, CA (US)

(73) Assignee: iSeeLoc Inc., San Jose, CA (US)

( * ) Notice: Subject to any disclaimer, the term of this patent is extended or adjusted under 35 U.S.C. 154(b) by 379 days.

(21) Appl. No.: 15/660,485

(22) Filed: Jul. 26, 2017

(65) Prior Publication Data

US 2017/0322294 A1 Nov. 9, 2017

Related U.S. Application Data

(63) Continuation of application No. 13/549,215, filed on Jul. 13, 2012, now Pat. No. 9,733,345.

(60) Provisional application No. 61/507,495, filed on Jul. 13, 2011.

(51) Int. Cl.

| G01S 3/48 | (2006.01) |
|---|---|
| G01S 1/72 | (2006.01) |
| G01S 11/02 | (2010.01) |
| G01S 11/08 | (2006.01) |

(52) U.S. Cl.
CPC ............ G01S 3/48 (2013.01); G01S 1/725 (2013.01); G01S 11/02 (2013.01); G01S 11/08 (2013.01)

(58) Field of Classification Search
CPC ...... G01S 11/08; G01S 3/46–50; G01S 11/02; G01S 1/725
See application file for complete search history.

(56) References Cited

U.S. PATENT DOCUMENTS

| 3,264,644 | A |   | 8/1966  | Jacob |
|---|---|---|---|---|
| 4,481,519 | A | * | 11/1984 | Margerum ............... G01S 3/48 |
|           |   |   |         | 342/147 |
| 4,636,796 | A |   | 1/1987  | Imazei |
| 4,800,541 | A |   | 1/1989  | Farmer et al. |
| 5,093,649 | A |   | 3/1992  | Johnson |
| 5,173,709 | A |   | 12/1992 | Lauro et al. |
| 5,214,436 | A |   | 5/1993  | Hannan |
| 5,266,958 | A |   | 11/1993 | Durboraw, III |
| 5,361,072 | A |   | 11/1994 | Barrick et al. |
| 5,381,444 | A |   | 1/1995  | Tajima |
| 5,610,612 | A |   | 3/1997  | Piper |
| 5,689,274 | A |   | 11/1997 | Rose |

(Continued)

FOREIGN PATENT DOCUMENTS

| KR | 2008002992 | 7/2008 |
|---|---|---|
| WO | WO2007123487 A1 | 11/2007 |

OTHER PUBLICATIONS

Phillips et al.,"A New Excitation Method: Combining Burst Random Excitation with Cyclic Averaging", IMAC 1999.

(Continued)

*Primary Examiner* — Matthew M Barker
(74) *Attorney, Agent, or Firm* — Haverstock & Owens LLP

(57) ABSTRACT

A system, device and method that enables units to communicate with each other and point to each other's location without requiring line-of-sight to satellites or any other infrastructure. Further, the system, device and method are able to operate outdoors as well as indoors and overcome multipath interference in a deterministic algorithm, while providing bearings at three dimensions, not only location but actual direction.

12 Claims, 10 Drawing Sheets

(56) References Cited

U.S. PATENT DOCUMENTS

| | | |
|---|---|---|
| 5,715,530 A | 2/1998 | Eul |
| 5,722,064 A | 2/1998 | Campana, Jr. |
| 5,724,047 A | 3/1998 | Lioio et al. |
| 5,815,117 A * | 9/1998 | Kolanek ............ G01S 3/043 342/442 |
| 5,945,947 A | 8/1999 | Cuningham |
| 5,982,322 A | 11/1999 | Bickley et al. |
| 6,307,380 B1 | 10/2001 | Hirai et al. |
| 6,459,415 B1 | 10/2002 | Pachal et al. |
| 6,529,142 B2 | 3/2003 | Yeh et al. |
| 6,556,942 B1 | 4/2003 | Smith |
| 6,573,683 B2 | 6/2003 | Chang |
| 6,646,601 B2 * | 11/2003 | Samson ............ G01S 3/54 342/113 |
| 6,812,824 B1 | 11/2004 | Goldinger et al. |
| 7,289,425 B2 | 10/2007 | Yeh et al. |
| 7,379,015 B2 | 5/2008 | Workman |
| 7,409,226 B1 | 8/2008 | Stevenson |
| 7,428,450 B1 | 9/2008 | Oberg |
| 7,595,755 B2 | 9/2009 | Newton et al. |
| 7,719,994 B2 | 5/2010 | Zumsteg |
| 7,917,155 B2 | 3/2011 | Karr et al. |
| 8,054,225 B2 | 11/2011 | Sim et al. |
| 8,125,372 B2 | 2/2012 | Focke et al. |
| 8,639,462 B2 | 1/2014 | Buccafusca |
| 9,389,297 B2 | 7/2016 | Zohar et al. |
| 9,733,345 B2 | 8/2017 | Zohar et al. |
| 2002/0089445 A1 | 7/2002 | Odashima et al. |
| 2003/0141973 A1 | 7/2003 | Yeh et al. |
| 2005/0259568 A1 | 11/2005 | Yeh et al. |
| 2006/0088042 A1 | 4/2006 | Shoham et al. |
| 2006/0148423 A1 | 7/2006 | Sharpe |
| 2008/0102859 A1 | 5/2008 | Karr et al. |
| 2008/0309765 A1 | 12/2008 | Dayan et al. |
| 2009/0085796 A1 | 4/2009 | Kuroda et al. |
| 2009/0289844 A1 | 11/2009 | Palsgrove et al. |
| 2010/0033365 A1 | 2/2010 | Kishida et al. |
| 2010/0109933 A1 | 5/2010 | Rhodes et al. |
| 2010/0151886 A1 | 6/2010 | Swope et al. |
| 2010/0207820 A1 | 8/2010 | Kawano et al. |
| 2010/0234044 A1 | 9/2010 | Lohbihler |
| 2012/0283987 A1 | 11/2012 | Busking |

OTHER PUBLICATIONS

Phillips et al., "Frequency Resolution Effects on FRF Estimation: Cyclic Averaging vs. Large Block Size", IMAC 1999.

Louis E. Frenzel, "Printed-Circuit-Board Antennas", Electronic Design, Mar. 2005.

* cited by examiner

SYSTEM AND METHOD FOR ENHANCED POINT-TO-POINT DIRECTION FINDING

RELATED APPLICATIONS

The application is a continuation of co-pending U.S. patent application Ser. No. 13/549,215, filed on Jul. 13, 2012, and entitled "SYSTEM AND METHOD FOR ENHANCED POINT-TO-POINT DIRECTION FINDING," which claims priority of U.S. provisional application, Ser. No. 61/507,495, filed Jul. 13, 2011, and entitled "SYSTEM AND METHOD FOR ENHANCED POINT-TO-POINT DIRECTION FINDING," by the same inventors, both of which are hereby incorporated in their entirety by reference.

FIELD OF THE INVENTION

The present invention is related to a direction finder. More particularly, the present invention is related to a system and method for determining a range and or bearing between two or more units.

BACKGROUND OF THE INVENTION

Existing technologies allow users to find a location but often do not function correctly under certain circumstances. For example, global positioning satellite (GPS) based systems rely on microwave signals transmitted by Medium Earth Orbit satellites; such microwave signals are affected by multipath propagation and atmospheric conditions. Effects of multipath propagation include data corruption, signal nulling, increased signal amplitude and decreased signal amplitude. Since acquiring and tracking such signals can therefore be difficult or impossible, particularly when used indoors, GPS-based systems may become increasingly inaccurate or stop working. Wideband and ultra wideband signals have been used for some time for locating items in radar, especially radar arrays for close proximity.

SUMMARY OF THE INVENTION

A system, device and method that enables units (or parts of units) to communicate with each other and point to each other's location without requiring line-of-sight to satellites (as GPS does) or any other infrastructure. Further, the system, device and method are able to operate outdoors as well as indoors and overcome multipath interference in a deterministic algorithm (vs. statistical), while providing bearings at three dimensions, not only location but actual direction, and pocket-sized implementation.

A first aspect of the present application is directed to a system for determining a range between two or more units. The system comprises a first unit including a first transmitter, a first receiver and a first processor, wherein the first unit is configured to transmit a first signal to the second unit with the first transmitter and a second unit including a second transmitter, a second receiver and a second processor, wherein the second unit is configured to receive the first signal with the second receiver and determine the distance between the first unit and the second unit (including a time base error) with the second processor based on the frequency. The second transmitter then transmits a signal that is received by the first receiver. The range (including a time base error) is calculated at the first unit. The range (including a time base error) information from the second unit is then transmitted to the first unit which then nulls the time base error and calculates the range between the units. In some embodiments, the first signal is a chirp signal comprising two or more chirps. In some embodiments, the converting comprises convoluting the first signal such that the first signal becomes a single-sideband signal. In some embodiments, the second receiver comprises one or more mixers and the converting comprises down converting the first signal with the mixers. In some embodiments, the down converting comprises performing a discrete Fourier transform on the first signal. In some embodiments, determining of the distance between the first unit and the second unit is further based on the propagation speed and frequency ramp of the first signal. In some embodiments, determining of the distance between the first unit and the second unit comprises multiplying the frequency of the second signal by the propagation speed of the first signal and dividing by the frequency ramp of the first signal. In some embodiments, the second unit is further configured to synchronize with the first unit. In some embodiments, the first unit comprises a user interface that enables a user to adjust the bandwidth of the first signal and or the number of the first signals transmitted in a sequence for adjusting the resolution of the range determined by the system, the second receiver has an intermediate frequency equal to zero. In some embodiments, the second unit comprises a display and is further configured to use the display to display the calculated range. In some embodiments, the first signal is the sum of a transmitted signal transmitted from a first unit and one or more reflections of the transmitted signal, and the second unit is configured to determine the lowest frequency component or lowest phase component of the second signal and determine the distance between the first unit and the second unit based on the lowest frequency component or the lowest phase component of the second signal. In some embodiments, the second unit comprises three or more antennas and the receiving comprises inputting the first signal with each of the antennas such that the second unit inputs a received signal for each of the antennas, wherein the second unit is configured to determine the lowest frequency component of each of the received signals, calculate the phase of the lowest frequency component of each of the received signals and determine the bearing between the first unit and the second unit based on two or more different pairs of the phases calculated. In some embodiments, the three or more antennas are positioned in an array at the corners of an equilateral triangle. In some embodiments, determining the bearing between the first unit and the second unit based on two or more different pairs of the phases calculated comprises computing a vector sum of the two bearings calculated from each pair of phases. In some embodiments, the second unit comprises a controller coupled to a first switching element, and further wherein the second receiver is selectively coupled to two or more of the antennas with the first switching element. In some embodiments, the second unit is further configured to switch which of the two or more antennas is coupled to the receiver with the first switching element based on commands received from the controller such that the second receiver serially receives the received signals of each of the two or more antennas through the first switching element. In some embodiments, the second receiver is selectively coupled to at least one signal transformer for each of the two or more antennas with a second switching element that is coupled to the controller. In some embodiments, the second unit is further configured to switch which of the signal transformers is coupled to the second receiver with the second switching element based on commands received from the controller such that the second receiver serially transmits the received signals of each of the two or more antennas through the second switching element to a different one of the signal transformers. In some embodiments, the second unit is further configured to use the controller to synchronize the switching of the first switching element with the switching of the second switching element. In some embodiments, one or both of the first and second switching elements are implemented on the second unit with software. In some embodiments, the second unit is further configured to use the controller to adjust the frequency of the switching of the first switching element and the second switching element in order to suppress the switching frequency from affecting the received signals. In some embodiments, the first unit comprises a first altimeter and the second unit comprises a second altimeter, and further wherein the second unit is further configured to use the second processor to calculate a vertical component of the bearing by comparing a first altitude value of the first unit measured by the first altimeter with a second altitude value of the second unit measured by the second altimeter. In some embodiments, the second unit comprises a display and is further configured to use the display to display the calculated bearing.

A second aspect of the present application is directed to a unit for determining a range between the unit and one or more other units. The unit comprises a transmitter for transmitting signals to the other units, a receiver for receiving signals from the other units and a processor for processing the received signals, wherein the unit is configured to convert a received signal received from one of the other units to a converted signal with the receiver and determine the distance between the unit and the one of the other units with the processor based on the frequency of the down-converted signal. In some embodiments, determining of the distance between the unit and the one of the other units comprises multiplying the frequency of the converted signal by the propagation speed of the received signal and dividing by the frequency ramp of the received signal. In some embodiments, the unit further comprises a user interface that enables a user to adjust the bandwidth of and or the number of signals to be transmitted in a sequence by the unit to the other units for adjusting the resolution of the range determined by the unit. In some embodiments, the received signal is the sum of a transmitted signal transmitted from the one of the other units and one or more reflections of the transmitted signal, and the unit is configured to determine the lowest frequency component of the converted signal and determine the distance between the unit and the one of the other units based on the lowest frequency component or the lowest phase component of the converted signal. In some embodiments, the unit further comprises three or more antennas coupled to the receiver, wherein the unit is configured to receive the received signal by inputting the received signal with each of the antennas, determine the lowest frequency component of the received signal inputted by each of the antennas, calculate the phase of the lowest frequency component of the received signal inputted by each of the antennas and determine the bearing between the unit and the one of the other units based on two or more different pairs of the phases calculated. In some embodiments, determining the bearing between the unit and the one of the other units based on two or more different pairs of the phases calculated comprises computing a vector sum of the two bearings calculated from each pair of phases. In some embodiments, the unit further comprises a controller coupled to a first switching element, wherein the receiver is selectively coupled to two or more of the antennas via the first switching element, wherein the unit is further configured to switch which of the two or more antennas is coupled to the receiver with the first switching element based on commands received from the controller such that the receiver serially receives the received signals of each of the two or more antennas through the first switching element. In some embodiments, the receiver is selectively coupled to at least one signal transformer for each of the two or more antennas via a second switching element that is coupled to the controller, wherein the unit is further configured to switch which of the signal transformers is coupled to the receiver. In some embodiments, the unit further comprises a display, wherein the unit is further configured to display the calculated bearing and or calculated range with the display.

A third aspect of the present application is directed to a method of determining a distance between two or more units. The method comprises transmitting a first signal from a first unit to a second unit, receiving the first signal at the second unit, down converting the first signal with a receiver of the second unit and determining the distance between the first unit and the second unit based on the frequency of the down-converted signal. In some embodiments, the first signal is a chirp signal comprising two or more chirps. In some embodiments, the converting comprises convoluting the first signal such that the first signal becomes a single-sideband signal. In some embodiments, the converting comprises down converting the first signal with a mixer of the receiver of the second unit. In some embodiments, the converting comprises performing a discrete Fourier transform on the first signal. In some embodiments, determining of the distance between the first unit and the second unit is further based on the propagation speed and frequency ramp of the first signal. In some embodiments, determining of the distance between the first unit and the second unit comprises multiplying the frequency of the second signal by the propagation speed of the first signal and dividing by the frequency ramp of the first signal. In some embodiments, the method further comprises synchronizing the first unit with the second unit. In some embodiments, the method further comprises adjusting the bandwidth of the first signal and or the number of the first signals transmitted in a sequence to create a desired resolution of the determined range. In some embodiments, the receiver of the second unit has an intermediate frequency equal to zero. In some embodiments, the method further comprises displaying the distance between the first unit and the second unit on the first unit or the second unit. In some embodiments, the method further comprises determining a bearing of the location of the first unit relative to the location of the second unit based on the first signal.

A fourth aspect of the present application is directed to a method of overcoming multi-path effects. The method comprises receiving a received signal at a second unit, wherein the received signal is the sum of a transmitted signal transmitted from a first unit and one or more reflections of the transmitted signal, converting the received signal to a converted signal with a receiver of the second unit, determining the lowest frequency component of the converted signal and determining the distance between the first unit and the second unit based on the lowest frequency component of the converted signal.

A fifth aspect of the present application is directed to a method of synchronizing a two or more units, wherein a first unit is able to generate a first signal and a second unit is able to generate a second signal. The method comprises transmitting the second signal from the second unit to the first unit and measuring a first time based difference with trip delay between the first signal and the second signal at the first unit, transmitting the first signal from the first unit to the second unit and measuring a second time base difference with trip delay between the second signal and the first signal at the second unit, determining the trip delay between the first unit and second unit based on the second time base difference with trip delay and the first time base difference with trip delay, determining the time base difference without trip delay between the first signal and the second signal based on the determined first or second time base difference with trip delay and the determined trip delay and synchronizing the first signal and the second signal based on the determined time base difference without trip delay. In some embodiments, the first signal and the second signal are chirp signals comprising two or more chirps. In some embodiments, the first signal matches the second signal. In some embodiments, the method further comprises transmitting a control signal from a first unit to a second unit, wherein the control signal requests the second unit to begin transmitting the second signal to the first unit. In some embodiments, the method further comprises adding an autocorrelation function to the second signal as a preamble at the second unit and transmitting the second signal to the first unit upon receiving the control signal from the first unit. In some embodiments, determining the time base difference without trip delay comprises summing the first time base difference with trip delay and the second time base difference with trip delay.

A sixth aspect of the present application is directed to a method of determining a bearing between two or more units. The method comprises receiving a first signal from a first unit at three or more antennas of a second unit such that the second unit inputs a received signal for each of the antennas, determining the lowest frequency component of each of the received signals, calculating the phase of the lowest frequency component of each of the received signals and determining the bearing between the first unit and the second unit based on two or more different pairs of the phases calculated. In some embodiments, the three or more antennas are positioned in an array at the corners of an equilateral triangle. In some embodiments, the determining the bearing between the first unit and the second unit based on two or more different pairs of the phases calculated comprises computing a vector sum of the two bearings calculated from each pair of phases. In some embodiments, the second unit comprises at least one receiver selectively coupled to two or more of the antennas with a first switching element that is coupled to a controller of the second unit. In some embodiments, the method further comprises switching which of the two or more antennas are coupled to the receiver with the first switching element based on commands received from the controller such that the receiver serially receives the received signals of each of the two or more antennas through the first switching element. In some embodiments, the at least one receiver is selectively coupled to at least one signal transformer for each of the two or more antennas with a second switching element that is coupled to the controller. In some embodiments, the method further comprises switching which of the signal transformers are coupled to the receiver with the second switching element based on commands received from the controller such that the receiver serially transmits the received signals of each of the two or more antennas through the second switching element to a different one of the signal transformers. In some embodiments, the controller synchronizes the switching of the first switching element with the switching of the second switching element. In some embodiments, one or both of the first and second switching elements are implemented with software. In some embodiments, the controller adjusts the frequency of the switching of the first switching element and the second switching element in order to suppress the switching frequency from affecting the received signals. In some embodiments, the method further comprises calculating a vertical component of the bearing by comparing a first altitude value of the first unit measured by an altimeter of the first unit with a second altitude value of the second unit measured by an altimeter of the second unit. In some embodiments, the method further comprises displaying the calculated bearing on a display of the second unit.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein or with equivalent alternatives.

Direction finding (DF) refers to the establishment of the bearing and range from which a received signal was transmitted. Embodiments of the presently claimed application are directed to a DF system, device and method that enable units (or parts of units) to communicate with each other via signals, and thereby point to each other's location without requiring line-of-sight to satellites (as GPS does) or any other infrastructure. The DF system, device and method is implemented with a network of two or more units/devices that are able to communicate via radio frequency (RF) or other types of signals and find the bearing and range to each other. The DF system, device and method are able to operate outdoors as well as indoors and overcome multipath interference in a deterministic algorithm (vs. statistical), while providing bearings at three dimensions, not only location but actual direction, and pocket-sized implementation. In particular, some embodiments of the DF system, device and method described herein extend the beneficial use of chirp signals to accomplish the above-described point-to-point range and bearing measurement.

Figure 1:
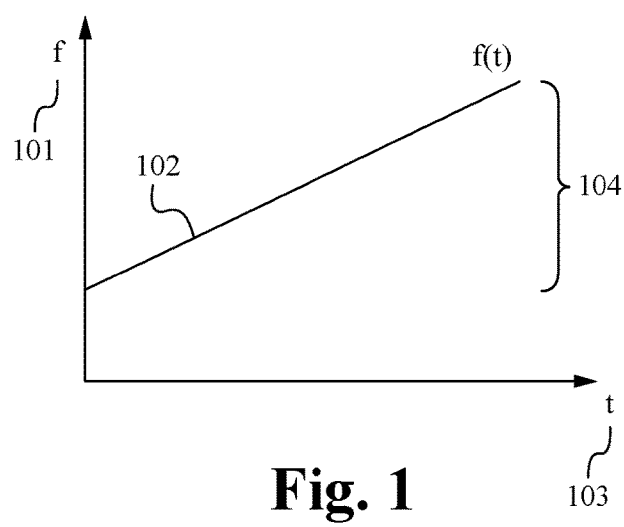
FIG. 1 illustrates a graph of the instantaneous frequency of a chirp signal according to some embodiments.

FIG. 1 illustrates a graph 100 of the instantaneous frequency of a linear chirp signal 102 according to some embodiments. As shown in FIG. 1, the graph of the chirp signal 100 comprises a frequency domain or frequency axis 101 and the time domain or time axis 103. In particular, the frequency f(t) 104 of the chirp signal 102 is able to be an "up-chirp" and start at the bottom of the frequency range and rise linearly over time to the top of the range. Alternatively, the chirp signal is able to be a "down-chirp" and have the inverse behavior wherein the frequency 104 of the chirp signal 102 starts at the top of the frequency range and drops linearly over time to the bottom of the range. Alternatively, the chirp signal 102 is able to be non-linear, such as an exponential chirp that exponentially rises or drops over time. In some embodiments, the chirp signals 102 described herein are able to be described by the equation:

$$\text{chirp}(f_c, A, t) = \cos(2\pi f_c t + \pi A t^2) \quad (1)$$

and the instantaneous frequency f(t) of the chirp signals 102 is able to be described by the equation:

$$f(t) \equiv \frac{1}{2\pi} \frac{d\phi(t)}{dt} = f_c + At \quad (2)$$

where $f_c$=The chirp minimal frequency [Hz], A=The chirp ramp [Hz/second] and t=time. Alternatively, the chirp signals 102 described herein are able to be described by other equations as are well known in the art.

Range Measurement in a Non-Reflective Environment

Figure 2:
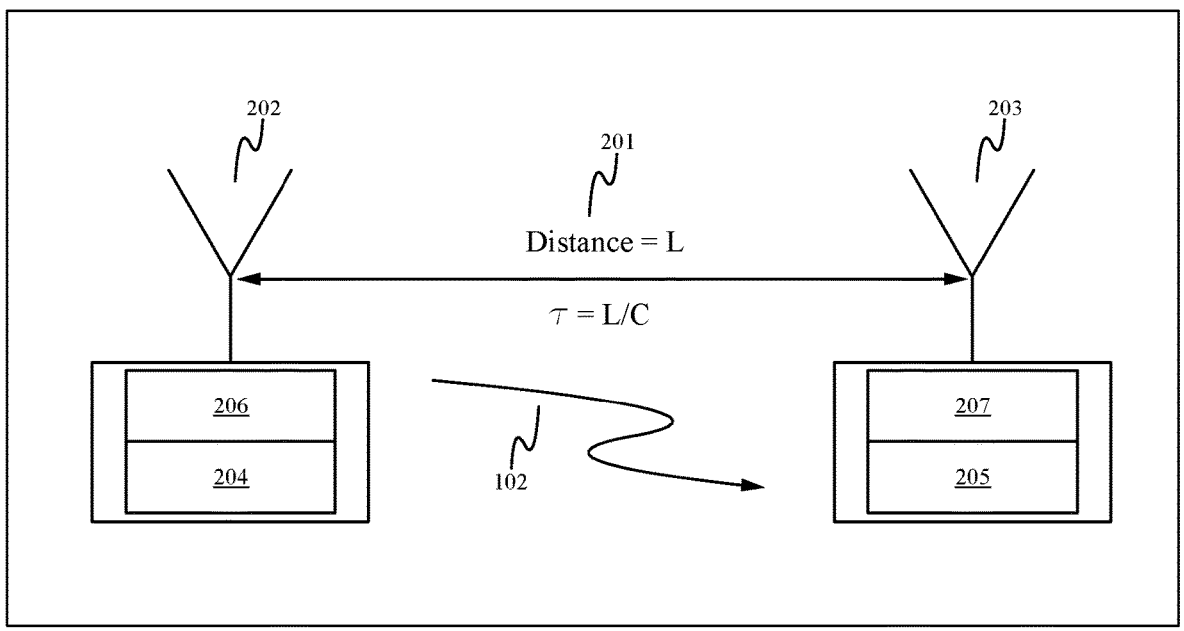
FIG. 2 illustrates a block diagram of a DF system in an unreflective environment according to some embodiments.

FIG. 2 illustrates a block diagram of a DF system 200 in an unreflective environment according to some embodiments. As shown in FIG. 2, the DF system 200 comprises a first unit 202 having a signal generator 206 and transmitter/receiver 204, and a second unit 203 having a signal generator 207 and transmitter/receiver 205. In particular, the first unit 202 is able to transmit a chirp signal 102 generated by the signal generator 206 to the second unit 203. In some embodiments, the chirp signal 102 is a radio frequency up-chirp. Alternatively, the chirp signal 102 is able to comprise other frequencies and be any combination of up or down chirps. In some embodiments, the first unit 202 and the second unit 203 comprise transceivers such that they are interchangeable and capable of both transmitting and receiving chirp and other signals at radio and other frequencies to each other. In some embodiments, communications within the DF system 200 are able to be in the radio frequency (RF) or in other frequency ranges. Each unit 202, 203 is able to be identified by a unique ID to enable communication between multiple units. The communications are able to be ensured by using, for example, half duplex, including cyclic redundancy checks (CRC) and acknowledgments (Ack) for every transferred message, however other suitable protocols are able to be used or adapted for ensuring communication as are well known in the art. Additionally, although the DF system 200 of FIG. 2 only shows two units 202 and 203, any number of receiving and/or first units are able to be included within the system 200.

As shown in FIG. 2, the transmitted chirp signal 102 travels distance L 201, wherein travel time or propagation delay τ is equal to L/C, where C is the propagation speed of the signal 102, which in this case is able to be the speed of light corrected for the medium (e.g. air). The chirp signal 102 as transmitted by the first unit 202 is T(t)=chirp($f_c$, A, t), where t is time, $f_c$ is the initial frequency, and A is the frequency ramp. However, due to the propagation delay τ, the chirp signal 102 as received by the second unit 203 is R(t)=T(t−τ)=chirp($f_c$, A, t−τ). For simplicity, these equations assume that the receiver 203 and transmitter 202 are fully synchronized and that the receiver unit 203 comprises a single-sideband (SSB) chirp down converting receiver or other type of down converting receiver as will be discussed in detail below.

Figure 3:
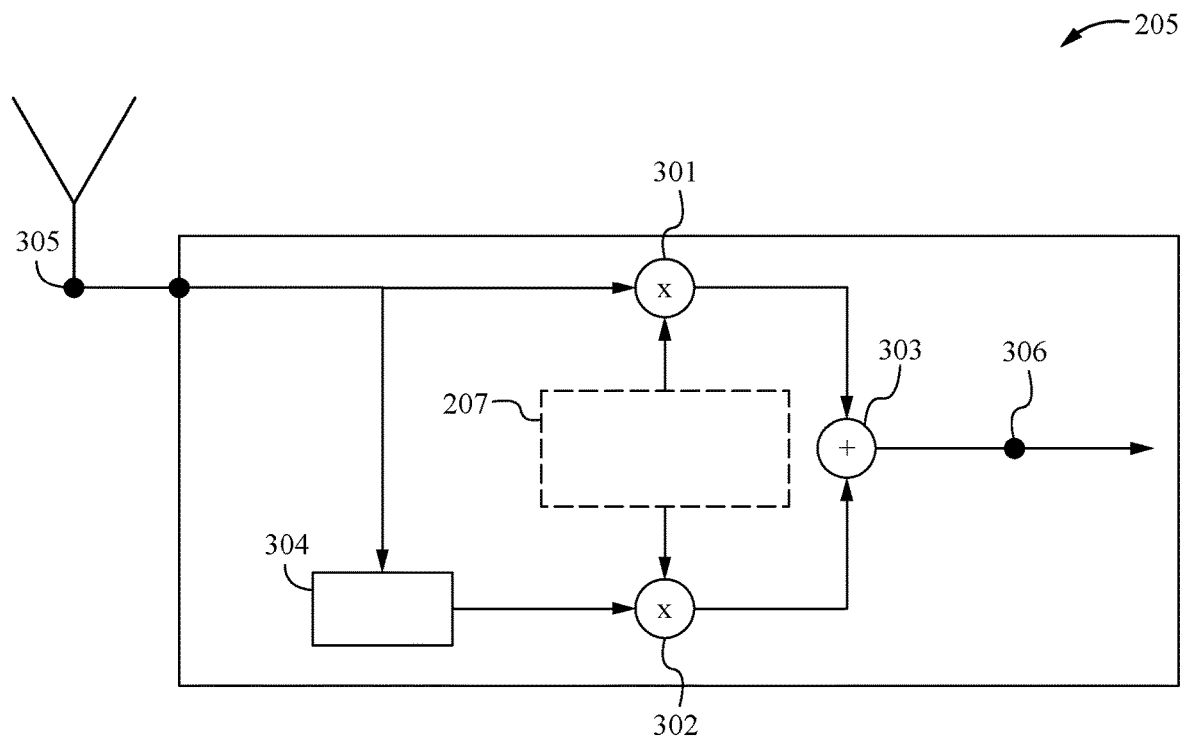
FIG. 3 illustrates a block diagram of the receiver as it receives the chirp signal according to some embodiments.

FIG. 3 illustrates a block diagram of the receiver 205 as it receives the chirp signal 102 according to some embodiments. As shown in FIG. 3, the receiver 205 comprises an input node 305 for inputting signals detected by an antenna, a Hilbert filter element 304, one or more signal mixers 301, 302, a summing element 303 and an output node 306. Specifically, the input node 305 is coupled to the input of one of the mixers 301 directly and to the input of the other mixer 302 via the Hilbert filter 304. The mixers 301, 302 each have inputs coupled to the signal generator 207 for receiving locally generated signals and an output coupled to the summing element 303, which is coupled to the output node 306. In some embodiments, the receiver 205 is a SSB down converting receiver. In some embodiments, the receiver 205 is configured such that it has an intermediate frequency $f_{IF}$ equal to zero (see for example http://en.wikipedia.org/wiki/Direct-conversion_receiver for information about zero IF receivers). Alternatively, the receiver 205 is able to be other types of down converting receivers having other intermediate frequencies. For example, the receiver 205 is able to comprise other components and configurations capable of down converting a received chirp signal 102 as are well known in the art. In some embodiments, the filter element 304 is able to be a different transform filter. Alternatively, a non-SSB receiver is able to be implemented.

As shown in FIG. 3, the chirp signal 102 enters at input node 305 and is input by the filter element 304 which filters the signal 102 (using a Hilbert transform) such that after summation at summing element 303 it becomes a SSB signal. In particular, as described above, if the chirp signal 102 as transmitted by the first unit 202 is T(t)=chirp($f_c$, A, t), the chirp signal 102 as received at input node 305 is R(t)=T(t−τ)=chirp($f_c$, A, t−τ). As a result, assuming that the chirp frequency is approximately equal to $f_c$ (e.g. if the modulating signal<<$f_c$), it is able to be shown that: Hilbert (R(t))≅sin [2π($f_c$−$f_{IF}$)(t−τ)+πA(t−τ)²]. A down conversion is then able to be performed on the signal 102 as input directly from the input node 305 and as output by the filtering element 304. Specifically, the mixers 301, 302 are able to down convert the received signals with the quadrate components of a local chirp signal generated by the signal generator 207. The resulting output signals are then output to the summing element 303 which sums the received signals and outputs the receiver output signal to the output node 306. Specifically, after the down converting the output signal is given by:

$$\text{out}(t) = \cos\left[2\pi(f_{IF} - A\tau)t + 2\pi\left(\frac{A}{2}\tau^2 - f_c\tau\right)\right] \quad (3)$$

where $f_{IF}$ is the intermediate frequency of the receiver 205. It should be noted that for the sake of brevity the amplitude of the signals was neglected during the above calculation and it was assumed that the receiver 205 and transmitter 204 are fully synchronized.

As a result, the output signal out(t) is then able to be then analyzed using Fast Fourier Transform (FFT) methods or other types of signal analysis (e.g. spectral estimation) methods as are well known in the art in order to determine the range of the first unit 202 from the second unit 203. In particular using these methods it is able to be determined that the output signal of the receiver is a sinusoidal signal at a frequency $f_{out}$ given by:

$$f_{out} = 2\pi(f_{IF} - A\tau) = 2\pi\left(f_{IF} - A\frac{L}{C}\right) \quad (4)$$

and at a phase of $2\pi((A/2)\tau^2 - f_c\tau)$, assuming $(A/2)\tau^2 \ll f_c\tau$, the phase $P(\tau)$ of the output signal is given by:

$$P(\tau) = -2\pi f_c \tau = -2\pi f_c \frac{L}{C} \quad (5)$$

Therefore, it is apparent that the difference between the receiver's output signal frequency $f_{out}$ and intermediate frequency of the receiver $f_{IF}$ is proportional to the distance L between the second unit 203 and first unit 202. Accordingly, as described above, with the intermediate frequency $f_{IF}$ of the receiver 205 chosen to be equal to 0, the output frequency $f_{out}$ is linear with the distance L. Similarly, the signal's phase $P(\tau)$ is practically linear to the distance L.

Figure 9:
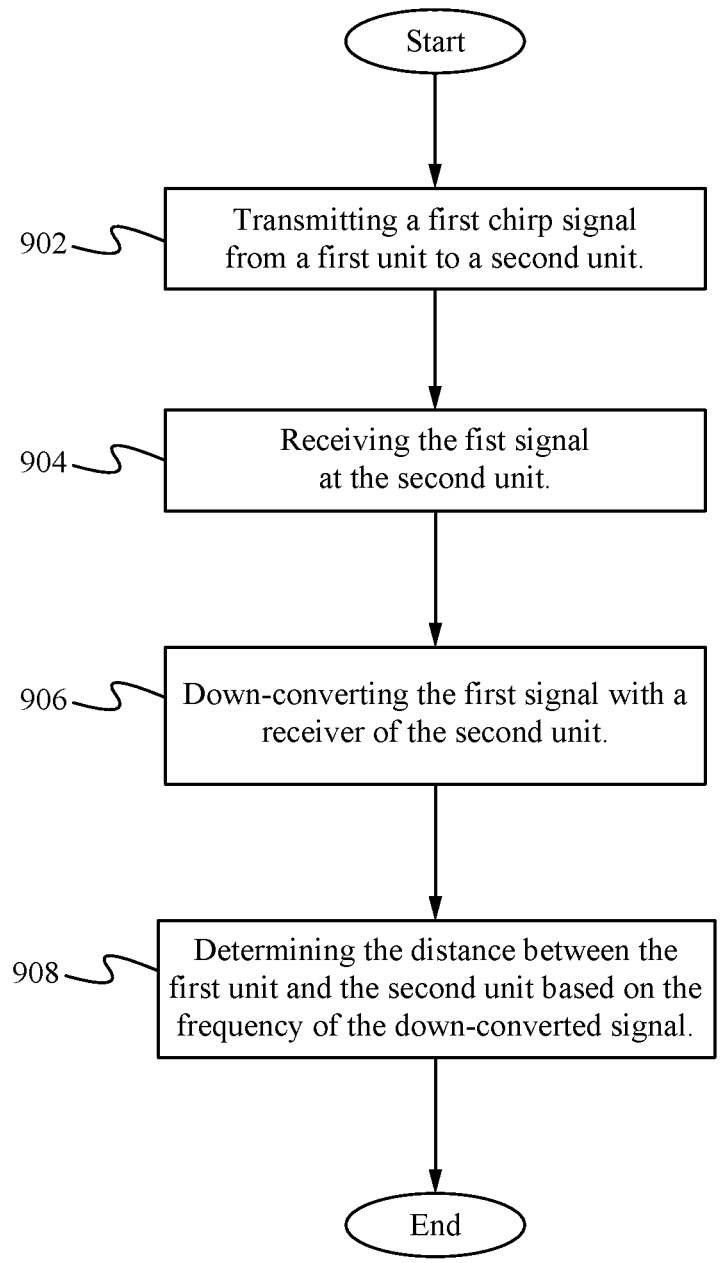
FIG. 9 illustrates a flow chart of a method of determining a trip delay plus time base error between two or more units according to some embodiments.

FIG. 9 illustrates a flow chart of a method of determining a distance between two or more units according to some embodiments. As shown in FIG. 9, the first unit 202 transmits a chirp signal 102 to the second unit 203 at the step 902. In some embodiments, the chirp signal 102 comprises two or more chirps. The second unit 203 receives the chirp signal 102 at the step 904. The receiver 205 of the second unit 203 converts the chirp signal 102 to a second signal at the step 906. In some embodiments, the converting comprises convoluting the chirp signal 102 such that the chirp signal 102 becomes a single-sideband signal. In some embodiments, the converting comprises down converting the chirp signal 102 with a mixer 301, 302 of the receiver 205 of the second unit 203. In some embodiments, the converting comprises performing a discrete Fourier transform on the chirp signal 102. The second unit 203 determines the distance between the first unit 202 and the second unit 203 based on the frequency of the second signal at the step 908. In some embodiments, determining of the distance between the first unit 202 and the second unit 203 is further based on the propagation speed and frequency ramp of the chirp signal 102. In some embodiments, determining of the distance between the first unit 202 and the second unit 203 comprises multiplying the frequency of the second signal by the propagation speed of the chirp signal 102 and dividing by the frequency ramp of the chirp signal 102. In some embodiments, the receiver 205 of the second unit 203 has an intermediate frequency equal to zero. In some embodiments, the method further comprises displaying the distance between the first unit 202 and the second unit 203 on the first unit 202 or the second unit 203. Thus, the method provides the advantage of enabling the range between the units to be accurately determined using the chirp signal 102.

Range Measurement in a Reflective Environment

Unlike the DF system 200 shown in FIG. 2 wherein a single signal takes a single path to the receiver unit 203, if a signal 102 is transmitted in a reflective environment (e.g., indoors), the received signal is able to be the sum of the unreflected or line-of-sight (LOS) signal and the reflections of the signal that each take different paths. This results in a multi-path problem in which it must be determined which component of the received signal is the unreflected signal and thus both points to and indicates the range to the first unit 202.

Figure 4:
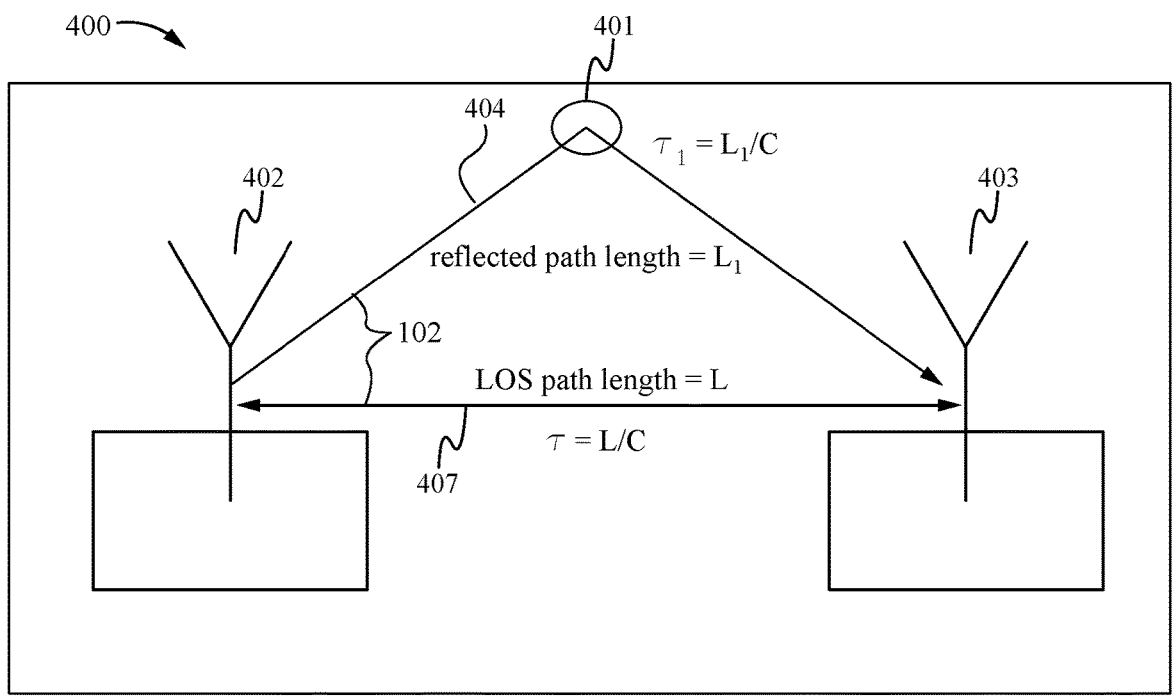
FIG. 4 illustrates a block diagram of a DF system in a reflective environment as described above according to some embodiments.

FIG. 4 illustrates a block diagram of a DF system 400 in a reflective environment as described above according to some embodiments. Specifically, the DF system 400 shown in FIG. 4 is substantially similar to the DF system 200 shown in FIG. 2 except for the differences described herein. As shown in FIG. 4, the DF system 400 comprises a first unit 402, a second unit 403 and a reflecting element 401. The reflecting element 401 is able to be any element or group of element able to reflect the signal 102. Although only a single reflecting element 401 creating a single reflection and reflection path 404 is shown, it is understood that any number of reflecting elements 401 and paths 404 are able to be present.

Thus, as described above, because the reflections of transmitted signals have different path lengths than the unreflected signal, said reflections each have different propagation delays τ when received by the receiver 203. As a result, the DF system 400 is able to distinguish between these different components of the received signal and determine which component relates to the unreflected or LOS signal. Further, by being able to discern the correct component having the LOS path, the bearing of the LOS path is also able to be determined by the system 400. Thus, the system provides the benefit of enabling corrections for both bearing and distance to be made, as opposed to using other signals, where a mix of the two would often occur.

As shown in FIG. 4, the transmitter 402 sends a chirp signal 102 via antenna, which is received by receiver 403 via antenna. The signal 102 has a direct or unreflected path 407 having a path length L, and the reflected path 404, reflected off of object 401, having a path length $L_1$. Thus, the signal received by the second unit 403 is given by:

$$R(t) = G \times T(t-\tau) + G_1 \times T(t-\tau_1) = G \times \cos\,[2\pi f_c(t-\tau) + \pi A(t-\tau)^2] + G_1 \times \cos\,[2\pi f_c(t-\tau) + \pi A(t-\tau)^2] \quad (6)$$

where $G$, $G_1$ are the received amplitudes for each path $L$, $L_1$. As a result, after processing the received signal as described in FIG. 3, the output signal out(t) of the receiver is given by:

$$\text{out}(t) = D \times \cos\left[2\pi(f_{IF} - A\tau)t + 2\pi\left(\frac{A}{2}\tau^2 - f_c\tau\right)\right] + \quad (7)$$
$$D_1 \times \cos\left[2\pi(f_{IF} - A\tau_1)t + 2\pi\left(\frac{A}{2}\tau^2 - f_c\tau_1\right)\right]$$

where $D$ and $D_1$ are amplitude constants. Then, assuming the intermediate frequency $f_{IF}$ of the receiver 403 is equal to zero, the output signal out(t) becomes:

$$\text{out}(t) = D \times \cos\left[2\pi A\tau t + 2\pi\left(\frac{A}{2}\tau^2 - f_c\tau\right)\right] + \quad (8)$$
$$\sum_{i=1}^{N}\left[D_1 \times \cos\left(2\pi A\tau_i t + 2\pi\left(\frac{A}{2}\tau_i^2 - f_c\tau_i\right)\right)\right]$$

where $\tau=L/C$ and $\tau1=L_1/C$. Consequently, it is able to easily be seen that for the more general case of N reflecting element 401 and N reflections having N reflected paths 404 the output signal out(t) is given by:

$$out(t) = D \times \cos\left(2\pi A \frac{L}{C} t - 2\pi f_c \frac{L}{C}\right) + \sum_{i=1}^{N}\left[D_i \times \cos\left(2\pi A \frac{L_i}{C} t - f_c \frac{L_i}{C}\right)\right] \quad (9)$$

Then, assuming $(A/2)\tau^2 \ll f_c\tau$ and substituting $\tau$ with $L/C$ returns the following equation for the receiver output signal at reflective environment:

$$out(t) = D \times \cos\left[2\pi A\tau t + 2\pi\left(\frac{A}{2}\tau^2 - f_c\tau\right)\right] + \\ D_1 \times \cos\left[2\pi A\tau 1 t + 2\pi\left(\frac{A}{2}\tau^2 - f_c\tau_1\right)\right] \quad (10)$$

Thus it is able to be seen that the signal is composed of N+1 sinusoids, with each sinusoid's frequency proportional to a path length, and each phase also practically linear to the path length. Thus, according to the system and method disclosed herein, the correct length/range and bearing is able to be calculated for each path based on the frequencies of the output signal $f_{out}$ and phases of the output signal, wherein the shortest path is the unreflected or LOS path. Further, it is able to be seen that the shortest path generates the lowest frequency $f_{out}$ if the intermediate frequency of the receiver is equal to zero.

Consequently, a simple spectral decomposition (e.g., FFT) enables measuring the frequency of the lowest frequency component of the received signal and deducing the range (distance from transmitter 402 to receiver 403). In particular, if the lowest component frequency is f, then $L=(f*C)/A$ defines the range measurement. Phase measurement is able to be done on the lowest frequency component enabling bearing measurement with multipath suppression. Accordingly, the DF system 400 provides the benefit of enabling multipath suppression as well as range determination by simply examining the lowest frequency component of the receiver output signal.

Figure 10:
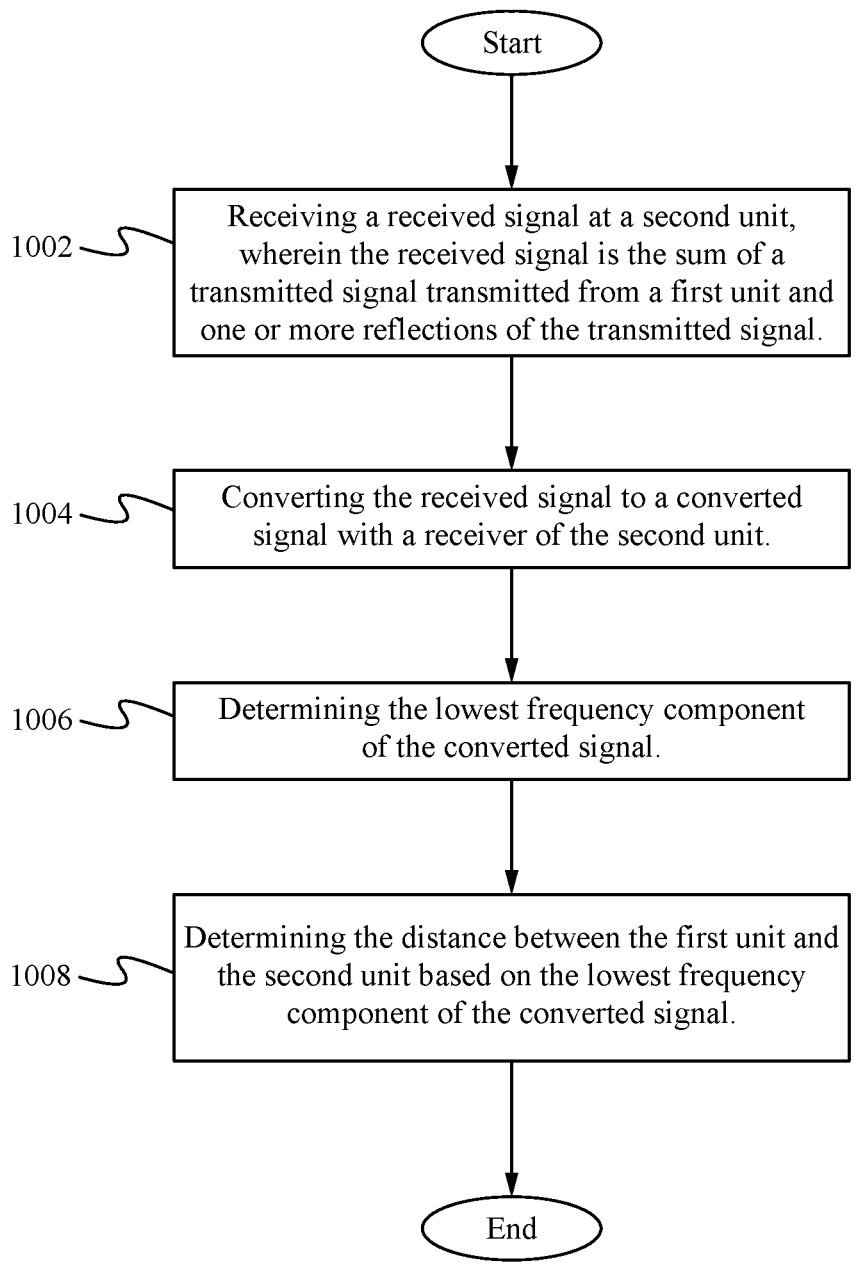
FIG. 10 illustrates a flow chart of a method of overcoming multi-path effects in determining a range and/or bearing between units according to some embodiments.

FIG. 10 illustrates a flow chart of a method of overcoming multi-path effects in determining a range and/or bearing between units according to some embodiments. A second unit 203 inputs a received signal that is the sum of an unreflected chirp signal 102 transmitted from the first unit 202 and one or more reflections of the chirp signal 102 at the step 1002. In some embodiments, the unreflected chirp signal 102 comprises two or more chirps. The receiver 205 of the second unit 203 converts the received signal to a converted signal at the step 1004. In some embodiments, the converting comprises convoluting the received signal such that it becomes a single-sideband signal. In some embodiments, the converting comprises down converting the received signal with a mixer 301, 302 of the receiver 205 of the second unit 203. In some embodiments, the converting comprises performing a discrete Fourier transform on the received signal. The second unit 203 determines the lowest frequency component of the converted signal at the step 1006. The second unit 203 determines the distance between the first unit 202 and the second unit 203 based on the lowest frequency component of the converted signal. In some embodiments, determining of the distance between the first unit 202 and the second unit 203 is further based on the propagation speed and frequency ramp of the unreflected chirp signal 102. In some embodiments, determining of the distance between the first unit 202 and the second unit 203 comprises multiplying the lowest frequency component of the converted signal by the propagation speed of the unreflected chirp signal 102 and dividing by the frequency ramp of the unreflected chirp signal 102. In some embodiments, the receiver 205 of the second unit 203 has an intermediate frequency equal to zero. In some embodiments, the method further comprises displaying the determined distance between the first unit 202 and the second unit 203 on the first unit 202 or the second unit 203. Thus, the method provides the advantage of enabling the range between the units to be accurately determined using the chirp signal 102 in a reflective environment wherein only the distance of the unreflected signal needs to be calculated.

Bearing Measurement

Figure 5:
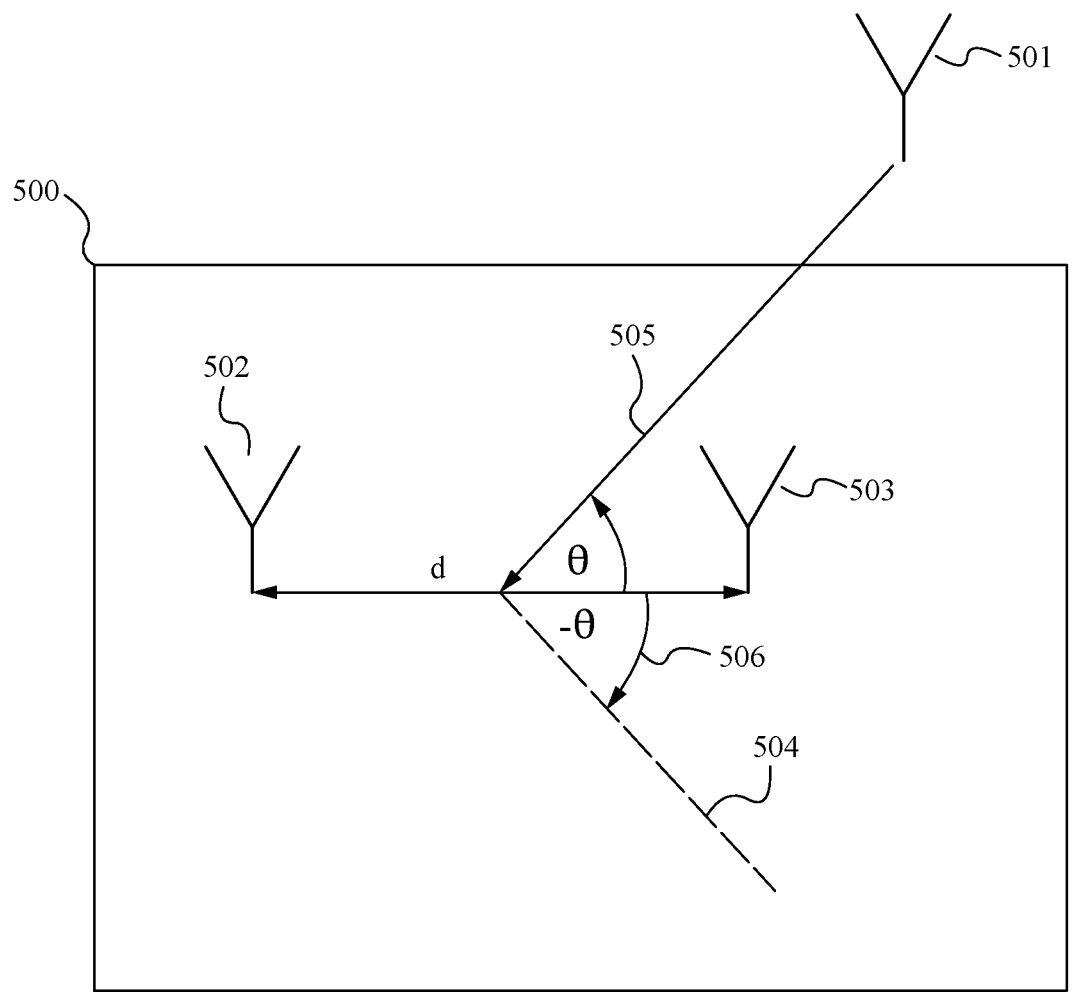
FIG. 5 illustrates a second unit configured to determine a bearing according to some embodiments.

FIG. 5 illustrates a second unit 500 configured to determine a bearing according to some embodiments. In some embodiments, the second unit 500 is substantially similar to the second unit 203 described in FIGS. 2 and 3 except for the differences described herein. As shown in FIG. 5, the second unit 500 comprises a plurality of antenna 502, 503 each coupled to one or more receivers (not shown) for receiving transmitted signals 505 from a transmitting antenna or source 501. In some embodiments, the plurality of antenna 502, 503 form an array and are positioned in a set formation such as at the corners of an equilateral triangle. Alternatively, the plurality of antenna 502, 503 are able to be positioned in other set formations such as along the perimeter of a circle or in other formations as are well known in the art. In some embodiments, the second unit 500 comprises two antennas 502, 503 wherein by detecting the angle and the side, the correct signal 505 is able to be defined, but a phantom signal 504 is also identified. Specifically, if the receiver 500 comprises only two antennas 502, 503, the transmitted signal 505 and the phantom signal 504 are not able to be distinguished because the sign of angle θ 506 is not given by the formula to determine the angle θ 506 using a single pair of antennas. Thus, alternatively the second unit 500 is able to comprise three or more antenna wherein the third and more antennas are able to be used to define another antenna pair in order to distinguish a phantom signal angle from the correct signal angle. In either case the bearing is able to be calculated as described below.

Specifically, the second unit 500 enables the bearing (θ) of a received signal (or to the transmitter) to be determined by 1) performing a spectral estimation (FFT or other type of spectral estimation) for the signal received at each antenna (by one or more receivers coupled to the antennas) and 2) calculating the phases P1, P2, . . . of the lowest frequency component of the signal received at each antenna, wherein the bearing is able to be calculated using any pair of the phases with the following equation:

$$\theta = \sin^{-1}\frac{\lambda \times (p_1 - p_2)}{2\pi d} \quad (11)$$

where λ is the average wave length of the transmitted signal and d is the distance between the two antennas where $d < \lambda/2$. In other words, using a single pair of phases P1, P2 from a single pair of antenna 502, 503, an ambiguous bearing of plus or minus θ is able to be determined. To eliminate the ambiguity, a second pair of phases (e.g. P1, P3 or P2, P3) from a second pair of antenna is able to be used to determine a second ambiguous bearing of plus or minus θ. In some embodiments, only a single ambiguous bearing is calculated and other means are used to determine the correct bearing of the two results. In some embodiments, two ambiguous bearings are calculated to determine the correct bearing from the four results.

Bearing Measurement Using a Switched Antenna Array

Figure 7:
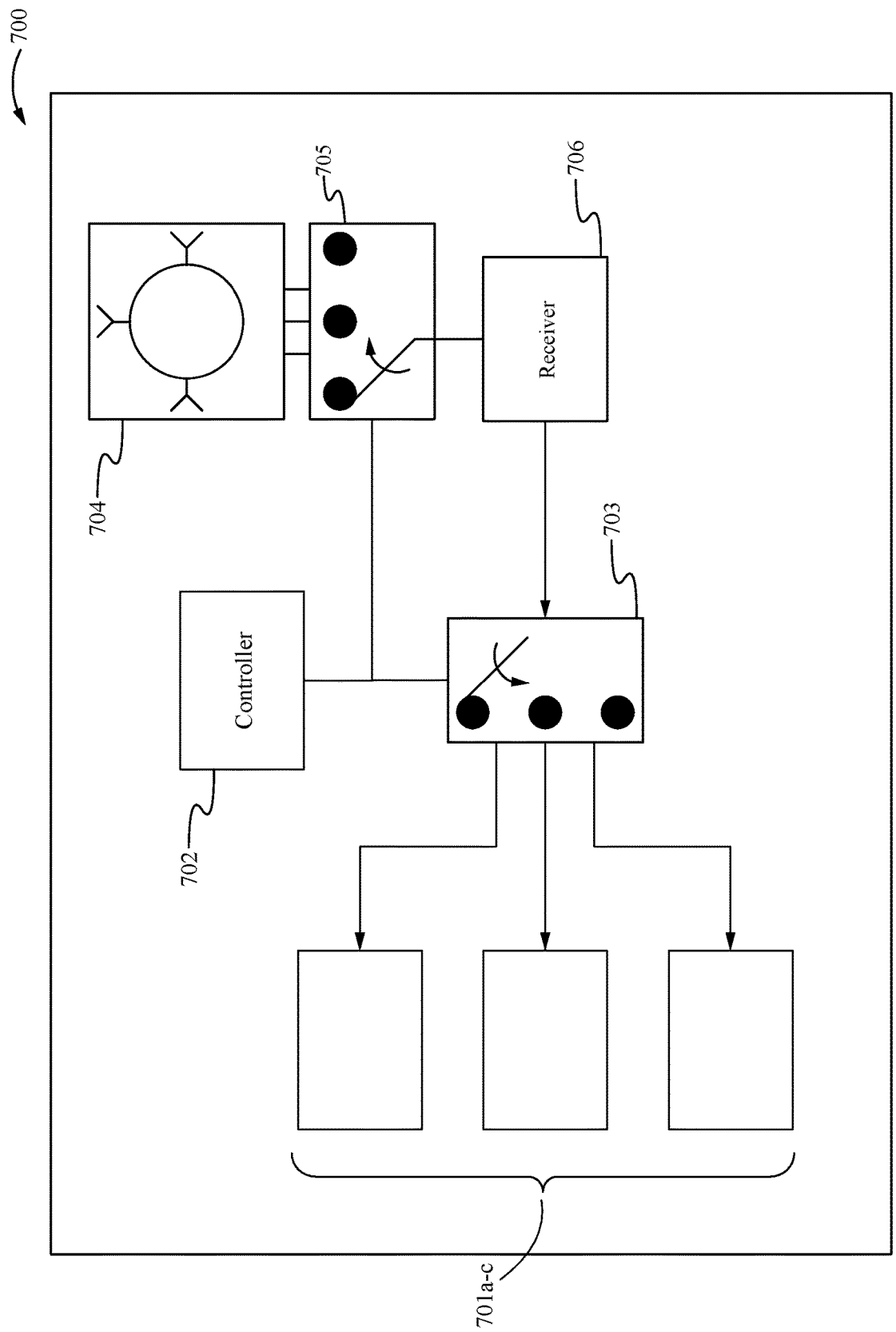
FIG. 7 illustrates a block diagram of a second unit having a switched antenna array according to some embodiments.

FIG. 7 illustrates a block diagram of a second unit 700 having a switched antenna array according to some embodiments. The second unit 700 is able to be substantially similar to the second units described in reference to FIGS. 2-5 described above. As shown in FIG. 7, the second unit 700 comprises an antenna array 704 having a plurality of antennas, one or more switching elements 703, 705, a receiver 706, a controller 702 and one or more spectral analysis or signal transformers 701*a-c*. Specifically, each antenna of the antenna array 704 is selectively coupled with the input of the receiver 706 via a first switching element 705. The output of the receiver 706 is then selectively coupled with the one or more transformers 701*a-c* via a second switching element 703. The controller 702 is also coupled to each of the switching elements 703, 705. In some embodiments, the plurality of antenna of the antenna array are positioned in a set formation such as at the corners of an equilateral triangle. Alternatively, the plurality of antenna are able to be positioned in other set formations such as along the perimeter of a circle or in other formations as are well known in the art. In some embodiments, the receiver 706 is able to be substantially similar to the receiver 205 described above with reference to FIGS. 2-5. Alternatively, other types of receivers 706 are able to be used.

In some embodiments, the switching elements 703, 705 are switching circuitry or switches that are able to controllably physically couple a primary connection to each of a plurality of secondary connections. For example, the switching elements 703, 705 are able to comprise radio frequency or other types of switches. Alternatively, one or more of the switching elements 703, 705 are able to implemented with switching software such as they are able to controllably virtually couple a primary connection to each of a plurality of secondary connections. In some embodiments, the transformers 701*a-c* are FFT elements that perform FFT spectral analysis on received signals. Alternatively, one or more of the transformers 701*a-c* are able to be other types of elements capable of performing spectral analysis on a received signal as are well known in the art. Although, as shown in FIG. 7, the second unit 700 comprises three antennas, a single receiver 706 and three transformers 701*a-c*, it is understood that the second unit 700 is able to comprise any number of antennas, receivers 706 and transformers 701*a-c*. For example, in some embodiments there is a separate receiver 706 and/or transformer 701 for each antenna within the array 704. Alternatively, one or more antennas are able to share or couple to a single receiver 706 and/or transformer 701 such there is at least one less receiver 706 and/or transformer 701 then the number or antennas within the array 704.

In operation, the controller 702 controls the switching of the first switching element 705 such that the received signal from each of the antennas of the antenna array 704 is sequentially coupled to the receiver 706 one at a time. The received signals are processed by the receiver 706 and are then individually/serially sent from the receiver 706 to one of the transformers 701*a-c* via the second switching element 703. In some embodiments, the received signals are processed by the receiver 706 in the same manner as described in reference to FIGS. 3-5. The controller 702 is able to control the switching of the second switching element 703 such that each signal received by the receiver 706 is coupled and output to a different transformer 701*a-c*. For example, the controller 702 is able to synchronize the switching of the first switching element 705 with the switching of the second switching element 703 such that a selected transformer 701*a-c* receives all signals input by a specified antenna of the array 704. In some embodiments, to suppress the switching frequency of the switching elements 703, 705 from affecting the resulting received signal spectrum for each of the antennas, the controller 702 is able to configure the switching between the antennas in a gradually changing frequency, in a pseudo random orthogonal sequence or in other manners that are able to suppress or minimize the switching frequency from affecting the received signals. In particular, these switching approaches are able to yield a spectrum of the receiver that is highly similar to an "unswitched" approach. Alternatively, the second switching element 703 is able to be omitted and all the received signals are able to be sequentially transmitted from the receiver to a single transformer 701. By comparing the results of these transformers 701*a-c*, as shown earlier in FIG. 3 and following discussions, both the bearing and the range of a transmitted signal/first unit are able to be calculated.

Vertical Bearings

In some embodiments, the calculated bearing is able to include a vertical or altitudinal aspect. Specifically, in some embodiments both the first unit 202 and the second unit 203 are able to comprise a barometric or other type of altimeter such as a micro digital altimeter. In such embodiments, the units 202, 203 are able to display/present the altitude difference with or separately from a calculated bearing and/or range by transmitting an altitude request signal to the other unit. In response to receiving the request signal, the other unit is configured to detect its current altitude with the local altimeter and transmit a response signal including the altitude data back to the first unit 202, 203. The first unit 202, 203 then determines its own altitude using its altimeter and computes the altitude difference between its value and the value received from the other unit. This determined difference equals the vertical component of the bearing and is then able to be displayed with or separately from the range and/or bearing on the first unit 202, 203. In some embodiments, if the other unit is out of range such that the request signal or response signal is not received, the first unit is able to use the last valid altitude data received from the other unit in order to calculate the vertical bearing component. This approach is very beneficial, especially for static targets (like parking cars), because it does not require the use of GPS or infrastructure and is in many cases able to extend the effective range of the unit 202, 203 beyond the radio frequency range.

Figure 11:
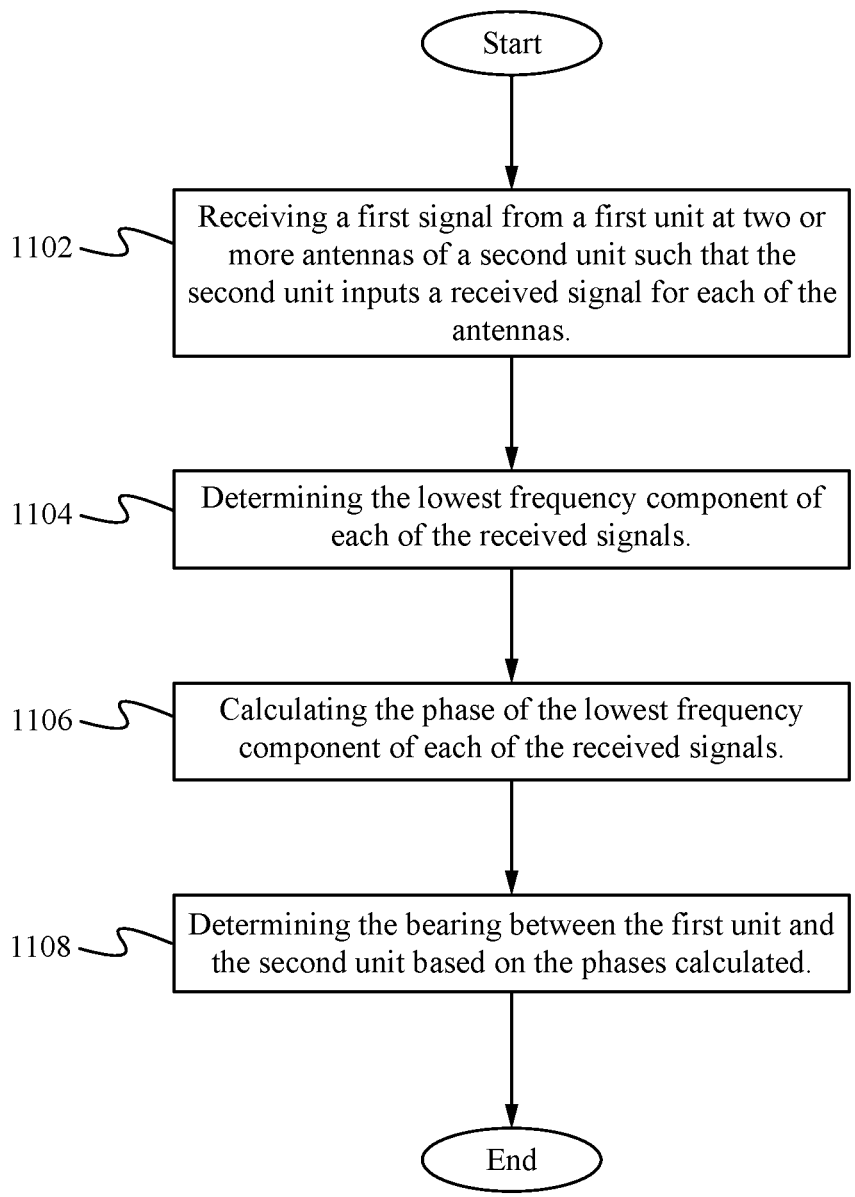
FIG. 11 illustrates a flow chart of a method of determining a bearing between two or more units according to some embodiments.

FIG. 11 illustrates a flow chart of a method of determining a bearing between two or more units according to some embodiments. A plurality of antennas of a second unit 203 receive a chirp signal 102 from a first unit 202 such that the second unit 203 inputs a received signal for each of the antennas at the step 1102. In some embodiments, the plurality of antennas comprises three or more antennas. In some embodiments, the three or more antennas are positioned in an array at the corners of an equilateral triangle. The second unit 203 determines the lowest frequency component of the received signals at the step 1104. The second unit 203 calculates the phase of the lowest frequency component of each of the received signals at the step 1106. The second unit 203 determines the bearing between the first unit 202 and the second unit 203 based on the phases calculated. In some embodiments, the bearing is determined based on two or more different pairs of the phases calculated. In some embodiments, the determining the bearing comprises computing a vector sum of the three bearings calculated from each of the three pair of phases. In some embodiments, the second unit 203 comprises at least one receiver 205 selectively coupled to two or more of the antennas with a first switching element 705 that is coupled to a controller 702 of the second unit 203. In some embodiments, the method further comprises switching which of the two or more antennas are coupled to the receiver 205 with the first switching element 705 based on commands received from the controller 702 such that the receiver 706 serially receives the received signals of each of the two or more antennas through the first switching element 705. In some embodiments, the at least one receiver 706 is selectively coupled to at least one signal transformer 701 for each of the two or more antennas with a second switching element 703 that is coupled to the controller 702. In some embodiments, the method further comprises switching which of the signal transformers 701 are coupled to the receiver 705 with the second switching element 703 based on commands received from the controller 702 such that the receiver 706 serially transmits the received signals of each of the two or more antennas through the second switching element 703 to a different one of the signal transformers 701. In some embodiments, the controller 702 synchronizes the switching of the first switching element 705 with the switching of the second switching element 703. In some embodiments, one or both of the first and second switching elements 703, 705 are implemented with software. In some embodiments, the controller 702 adjusts the frequency of the switching of the first switching element 705 and the second switching element 703 in order to suppress the switching frequency from affecting the received signals. In some embodiments, the method further comprises calculating a vertical component of the bearing by comparing a first altitude value of the first unit 202 measured by an altimeter of the first unit 202 with a second altitude value of the second unit 203 measured by an altimeter of the second unit 203. In some embodiments, the method further comprises displaying the calculated bearing on a display 807 of the second unit 203. Accordingly, the method of determining a bearing provides the benefit of enabling an unambiguous bearing to be determined for only the direct or unreflected signal.

Chirp Signal Bandwidth Considerations

Although the chirp signal 102 described in the previous sections is theoretically able to be neither time limited nor bandwidth limited, such a signal would be impractical. Accordingly, in some embodiments the 2.4 GHz Industrial, Scientific and Medical (ISM) radio band (wherein the bandwidth (BW) is limited to 83.5 MHz) and a chirp signal 102 length (T) of 1 ms are able to be selected resulting in a chirp ramp A that is equal to BW/T=83.5 MHz/1 ms=83.5e9 [Hz/sec]. Alternatively, other pulse lengths T and bandwidths are able to be chosen resulting in differing chirp ramps A.

DF System Resolution

The ability to distinguish between two paths (e.g. reflected and direct) as well as the range measurement resolution is dependent on the frequency difference per distance (frequency separation) of the chirp signal 102 and on the resolution of the spectrum estimator/transformer 701. The frequency separation is given by $df=A \times (dl/C)$, wherein a separation of dl path length produces a df frequency offset at the receiver 205 output signal out(t). Assuming the use of FFT as a spectral estimator, the frequency resolution of the estimator is given by $\Delta f=1/T_{window}$ where $T_{window}$ is the sampling window length. As a result, the range resolution of the DF system 200 is able to be calculated by comparing df to $\Delta f$, where if $df=\Delta f$, then:

$$A \times (dl/C) = 1/T_{window} \quad (12)$$

Assuming a single chirp is transmitted per signal 102, then:

$$A = BW/T_{window} \quad (13)$$

And thus, the DF system 200 range resolution per single chirp pulse (as well as the multipath mitigation ability) is given by:

$$\Delta l = C/BW. \quad (14)$$

Thus, for BW=83.5 MHz, the range resolution is 3.59 m, resulting in a maximal estimated error of approximately 1.8 m. For many applications this is not a sufficiently low error. To improve that, a sequence of two or more chirp signals are able to be transmitted per signal 102, resulting in a longer sampling window $T_{window}$ and lower range error. Specifically, for a sequence of two 1 ms length chirp signals the maximal range estimation error reduces to 0.9 m (with an average error of about 0.45 m).

Figure 6:
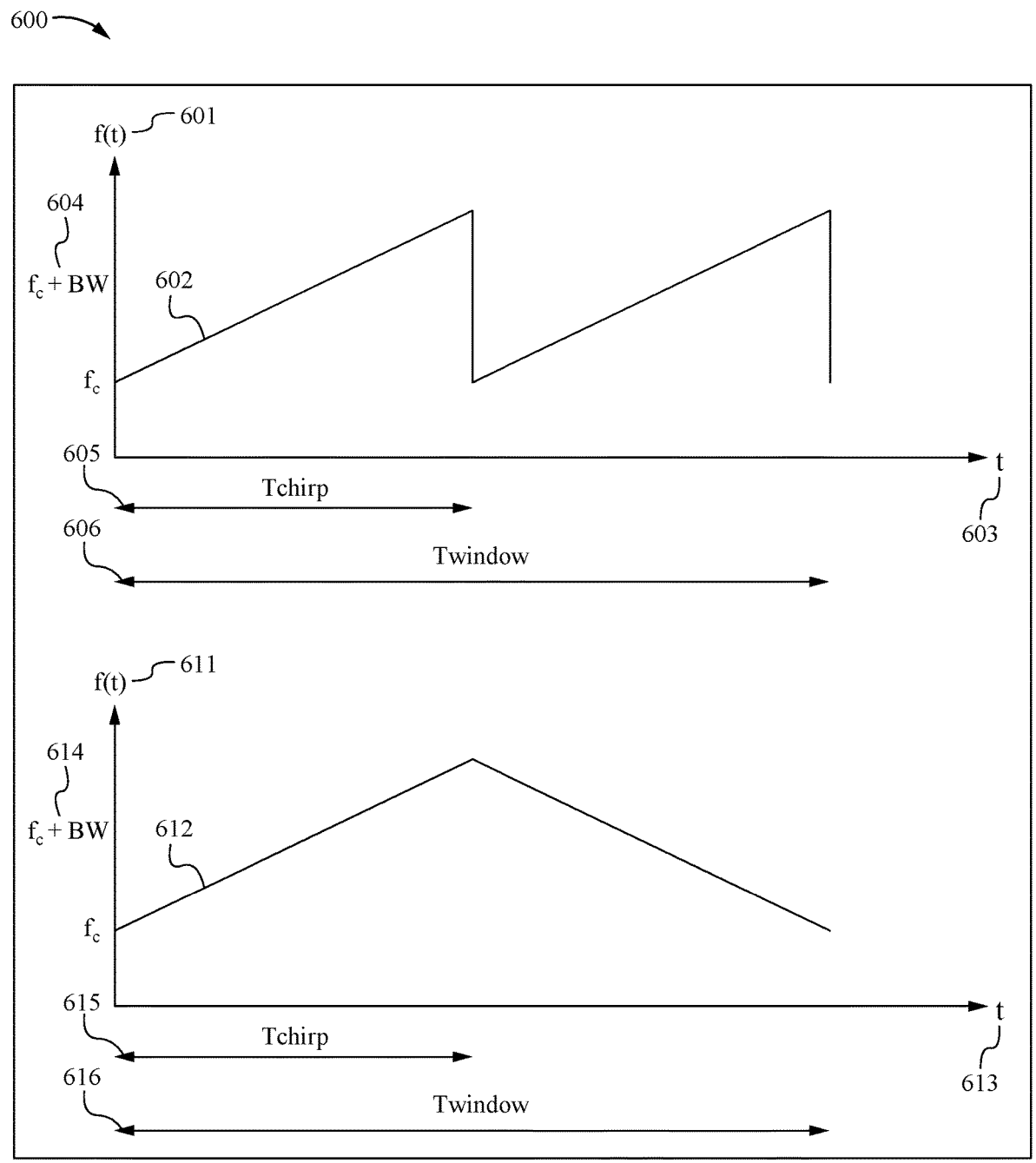
FIG. 6 illustrates a graph of two chirp signals each having two chirps according to some embodiments.

Accordingly, in some embodiments, the chirp signal 102 is able to comprise two or more chirps as shown in the chart 600 illustrated in FIG. 6. In particular, FIG. 6 illustrates two chirp signals 601, 611 each having two chirps according to some embodiments. As shown in FIG. 6, curve 602 shows multiple, repeated up-chirps going up and then starting again for each chirp, whereas curve 612 shows an up-chirp ramp-up and then a down-chirp down slope. Specifically, the first chirp of each signal 602, 612 is shown by $T_{chirp}$ 605, 615 compared to the entire signal 602, 612 of both chirps shown by $T_{window}$ 606, 616. Both curves 602, 612 are set on axes of a chirp frequency 604, 614 and a window time 603, 613. Additionally, it should be noted that the sequence of two or more up-chirps, down-chirps and/or a combination of up and down chirps per signal 102 is possible. In some embodiments, to further improve the DF system 200 range resolution, other signal spectral estimators/transformers are able to be used such as MUSIC, ESPRIT, SAGE, and other types of transformers as are well known in the art (For more information see http://www.dtic.mil/dtic/tr/fulltext/u2/a514411.pdf).

Time Synchronization Between Units

In the previous discussions, a theoretical assumption was made that the first and second units 202, 203 are fully synchronized. This approach is obviously impractical. To overcome this problem, the signal generators 206, 207 of the units 202, 203 are able to generate a local repetitive chirp signal. As a result, assuming that the time base difference between the units is $T_0$, the local chirp signal at the first unit 202 is able to be represented as $X_{first}=chirp(f_o, A, t)$, and the local chirp signal at the second unit 203 is able to be represented as $X_{second}=chirp(f_o, A, t+T_0)$.

The synchronization is then able to be performed in three levels:

1. Control-level synchronization. The units 202, 203 communicate by sending control signals to each other (e.g., via FSK or other types of communication). Specifically, a control signal is able to be sent from the first unit to the second unit (or vice versa) that requests the second unit to begin sending the local chirp signal of the second unit to the first unit. This control signal method crudely synchronizes the units 202, 203 and limits $T_0$ to a typical range of hundreds of µs.
2. Sampling time synchronization level. The second unit 203 adds a preamble to its local chirp signal comprising a narrow autocorrelation function. In some embodiments, the autocorrelation function comprises a Zadoff-Chu (ZC) sequence. Alternatively, other types of autocorrelation functions or orthogonal signals are able to be used. Upon receiving the preamble to the local chirp signal of the second unit, the first unit 202 shifts its local chirp signal based on a cross correlator that recognizes the received timing of the autocorrelation function of the preamble. This approach further synchronizes the units 202, 203 and limits $T_0$ to a typical range of sampling time period (e.g., for sampling rate of 1 MHz: $|T_0|<1$ μs). However, for most applications, this still does not allow accurate enough measurement, as 1 μs at the speed of light equals a range error of about 300 m.

3. Fine synchronization. The local chirp signal sequence is transmitted from the second unit 203 to the first unit 202, the first unit 202 receives the chirp signal of the device 203 shifted by the trip delay (τ). Thus, the Xfreceiving signal as received by the first unit 202 is given by:

$$X_{freceiving} = \text{chirp}(f_o, A, t+T_0-\tau). \quad (15)$$

Therefore, the first device is able to measure (e.g. using the method described above in the Range measurement sections) the time difference between the received signal $X_{freceiving}$ and its own local chirp sequence $X_{first}$. Given the above, it is able to be seen that the measured time base difference result at the first unit 202 will be $t+T_0-\tau-t$, which is equal to the value of $T_0-\tau$.

The first unit 202 transmits its local chirp signal $X_{first}$ to the second unit 203. Therefore, the second unit 203 receives the chirp signal of the first unit 202 shifted by the trip delay (τ), which is given by $X_{rsecond} = \text{chirp}(f_o, A, t-\tau)$. The second unit 203 is then able to similarly measure the time difference between the received signal $X_{rsecond}$ and its own local chirp signal $X_{second}$. In this case, it is able to be seen that the measured time base difference result at the second unit 203 will be $t-\tau-(t+T_0)$, which is equal to the value of $-\tau-T_0$.

Accordingly, this measured time base difference value at the second unit 203 is able to be sent to the first unit 202 and the measured time base difference value at the first unit 202 is able to be summed with the measured time difference value at the second unit 203. This summed value will be equal to $T_0-\tau-\tau-T_0$ which is equal to $-2\tau$ (because the synchronization error $T_0$ is canceled out), meaning that the trip delay τ is equal to the summed value divided by $-2$. The range is straightforwardly calculated by multiplying the trip delay with the signal propagation speed. In addition for other purposes than range measurement, once the value of the trip delay τ is determined, the first unit 202 is able to plug that value back into the time base difference equation, wherein the measured time base difference result at the first unit 202 is equal to the value of $T_0-\tau$ in order to solve for $T_0$ (e.g. the synchronization error or time base difference between the first unit 202 and the second unit 203) The first unit 202 is able to adjust the local chirp signal and/or other signals such that they are synchronized with the second unit 203 based on the determined value $T_0$. It should be noted that synchronization is needed for range measurement, whereas bearing measurement are able to be performed as described above even for an unsynchronized system. Note that the order of transmission is able to be exchanged so that the first to transmit will be the first unit 202 followed by a transmission from the second unit 203.

Figure 12:
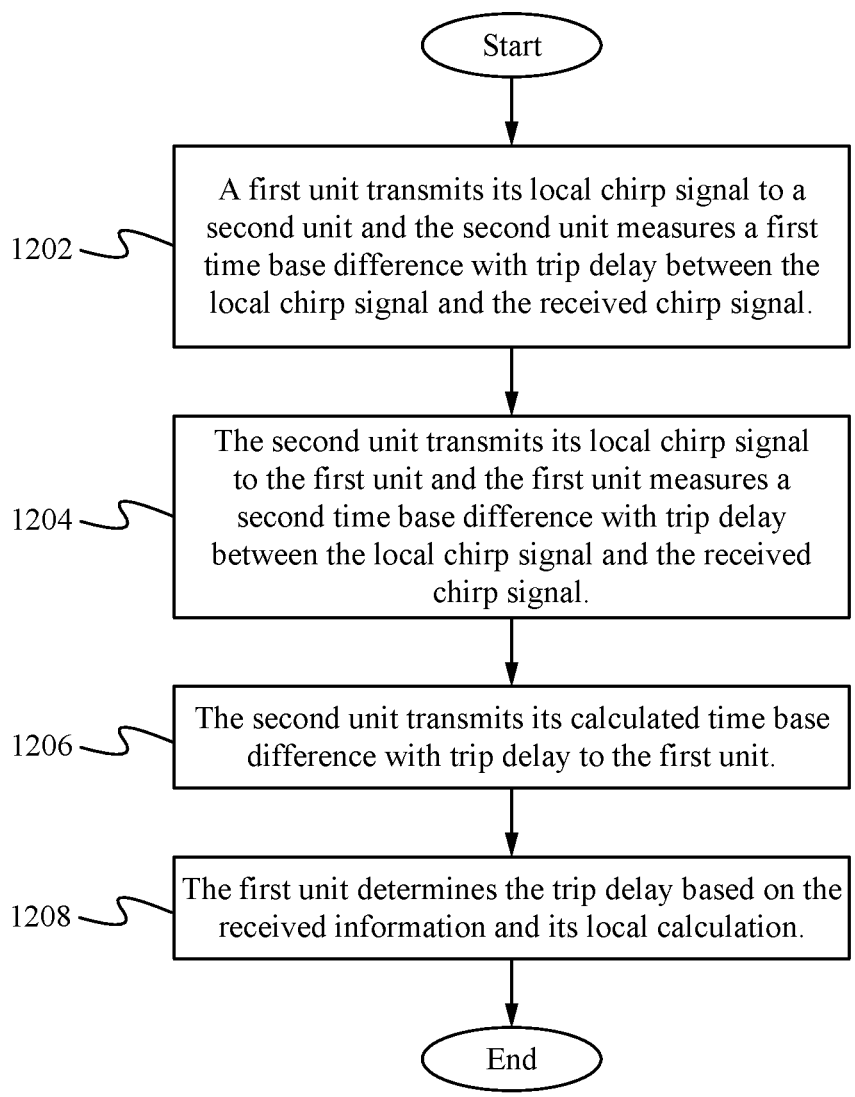
FIG. 12 illustrates a flow chart of a method of synchronizing a two or more units according to some embodiments.

FIG. 12 illustrates a flow chart of a method of synchronizing a two or more units according to some embodiments. A first unit 202 transmits its local chirp signal to a second unit 203 and the second unit 203 measures a first time base difference with trip delay between the local chirp signal and the received chirp signal at the step 1202. The second unit 203 transmits its local chirp signal to the first unit 202 and the first unit 202 measures a second time base difference with trip delay between the local chirp signal and the received chirp signal at the step 1204, wherein the second time base difference has an opposite sign as the first time base difference. The second unit 203 transmits its calculated time base difference with trip delay to the first unit 202 at the step 1206. The first unit 202 determines the trip delay based on the received information and its local calculation at the step 1208. In some embodiments, the first unit 202 synchronizes the local first unit chirp signal with the local second unit chirp signal based on the determined time base difference without trip delay. In some embodiments, the local chirp signals each comprise two or more chirps. In some embodiments, the local first unit chirp signal matches the local second unit chirp signal. In some embodiments, the method further comprises transmitting a control signal from the first unit 202 to the second unit 203, wherein the control signal requests the second unit 203 to begin transmitting the local second unit chirp signal to the first unit 202. In some embodiments, the method further comprises adding an autocorrelation function to the local second unit chirp signal as a preamble at the second unit 203 and transmitting the local second unit chirp signal to the first unit 202 upon receiving the control signal from the first unit 202. In some embodiments, the method further comprises receiving the local second unit chirp signal from the second unit 203 and shifting the local first unit chirp signal based on the autocorrelation function to increase synchronization between the local signals. In some embodiments, determining the time base difference without trip delay comprises summing the first time base difference with trip delay and the second time base difference with trip delay.

Signal Sampling Rate at the Receiver

It is able to be seen from the equation (10), described above for the receiver output signal out(t), that the path-related frequencies are given by $A(L_i/C)$, where $L_i$ is a specific path length. As the path is able to be a result of a multi-order reflections (e.g. the signal bounces from the source to a reflector and then to other reflectors) the maximal path length $L_i$ is theoretically infinite and so is the output frequency of the output signal out(t). The signal strength, however, fades with path length. As a result, the receiver 205 is able to be configured/adjusted such that unwanted signals below a signal strength threshold are able to be ignored. For example, assuming interest only in signals that are 10 dB below the maximum LOS signal strength (e.g. a 10 dB signal strength threshold), and assuming that the DF system 200 is built for a maximum range of $L_{max}$, the range that generates a 10 dB lower signal is $3.16*L_{max}$ (assuming free space signal fading). Alternatively, the signal strength threshold is able to be greater or less than 10 dB below the maximum LOS signal strength. The maximum resulting frequency is given by the following equation for the maximum output frequency:

$$f_{max} = A\frac{3.16 L_{max}}{C} \quad (16)$$

The sampling frequency is able to satisfy Nyquist theorem and be thus more than double $f_{max}$. If de-chirping is performed prior to sampling, then, $f_{max} = A(L_{max}/C)$, as higher frequencies are able to be filtered out. In this example, for a mile $L_{max}$ and BW=83.5 MHz, a sampling rate of 1 megasample per second (MSPS) is able to suffice. Accordingly, in some embodiments, the signal strength threshold and/or the maximum range $L_{max}$ of the receiver 205 are able to be adjusted by a user. If only the direct path is of interest (e.g. for range calculation) then filtering is able to be implemented assuming $L_{max}$ as the maximum range of the direct path.

Hardware Implementations

Figure 8:
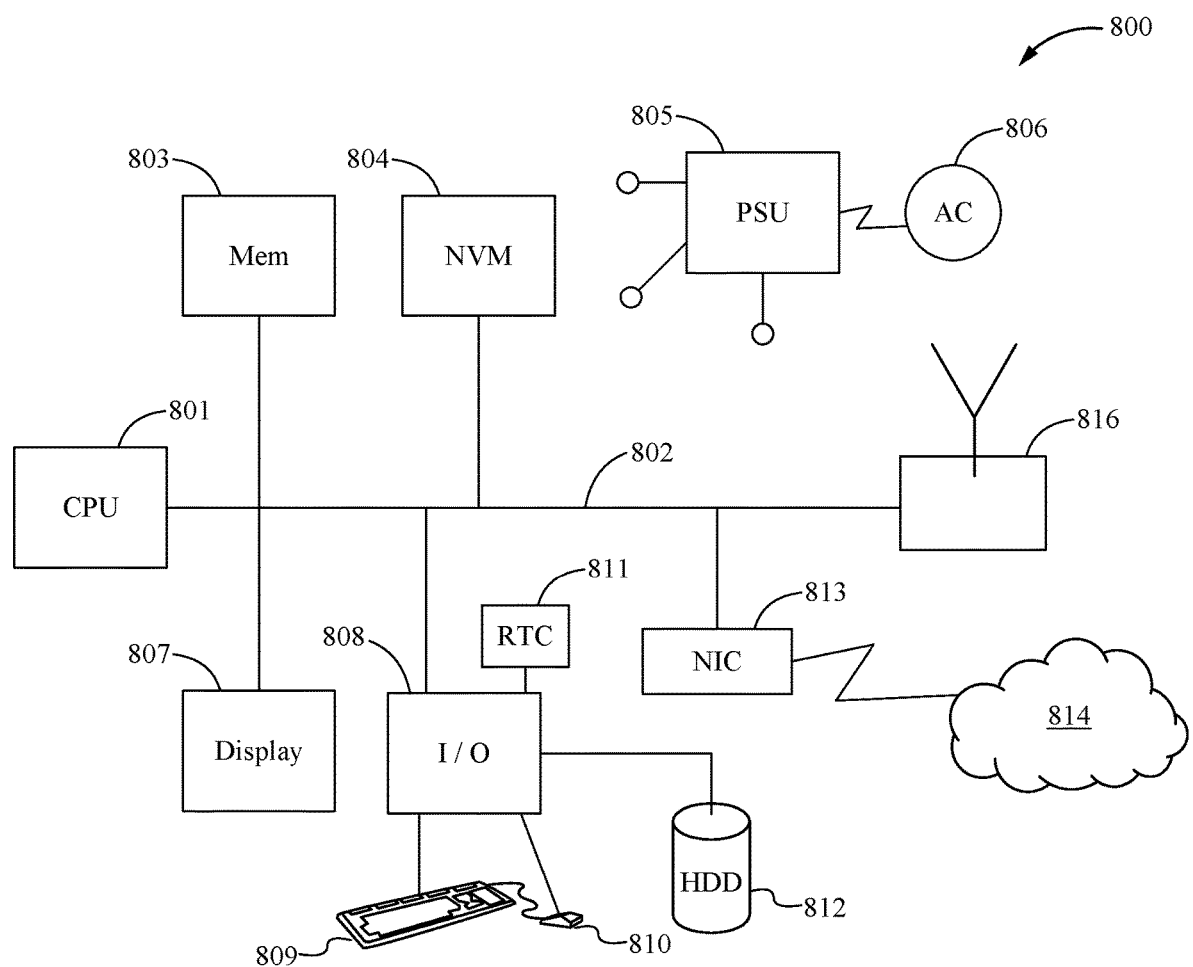
FIG. 8 illustrates a block diagram of a DF system that is able to be used to perform the functions described herein according to some embodiments.

FIG. 8 illustrates a block diagram of a DF system 800 that is able to be used to perform the functions described herein according to some embodiments. Specifically, the DF system 800 is able to be substantially similar to the first and/or second units 202, 203 except for the differences described herein. As shown in FIG. 8, the system 800 comprises a transceiver 816, a central processing unit (CPU) 801, a bus 802, memory 803, nonvolatile memory 804, a display 807, an I/O unit 808, and a network interface card (NIC) 813 all coupled together via the bus 802. The transceiver 816 is able to comprise the transmitting and/or receiving components described above in relation to FIGS. 2-7. In some embodiments, the transceiver 816 is integrated into a device of the system 800. Alternatively, one or more of the components of the transceiver 816 are able to be added as one or more NICs to the system 800 and/or coupled to the device via the network 814. In some embodiments, all or some of the components of the system 800 are able to be further integrated into one or more chips or integrated devices, reducing the component count and the cost of the system 800. The I/O unit 808 is able to, typically, be coupled to a keyboard 809, a pointing device 810, a hard disk 812, a real-time clock 811 and/or other peripheral devices. The NIC 813 is able to couple with a network 814, which is able to be the Internet, a local network, or other types of wired or wireless networks as are well known in the art. Also shown as part of system 800 is power supply unit 805 which is coupled to an ac power supply 806. Alternatively, or in addition to the system 800 is able to comprise batteries or other types of power sources. In some embodiments, the system 800 is able to comprise a graphical user interface (GUI) that enables a user to select one or more units to target, command the device to determine a bearing and/or range to the targeted units and/or perform the other adjustments and or commands described herein. In addition, the system 800 is able to comprise other devices and modifications that are well known in the art but have been omitted for the sake of brevity. It is understood that various modifications and changes are able to be made to the system 800 without departing from the broader spirit and scope of the system and method disclosed herein.

SUMMARY OF ADVANTAGES

The DF system, device and method described herein enables devices (or parts of devices) to communicate with each other and point to each other's location including the following advantages:

The system does not require line of site to satellites (like GPS) nor other infrastructure.

The technology enables point-to-point direction finding with no need for any infrastructure.

The system operates outdoors as well as indoors and is able to overcome multipath interference in a deterministic algorithm (vs. statistical).

The technology is able to provide bearings in three dimensions.

Pocket size implementation.

Provides not only location but actual direction (i.e. bearing).

The algorithm/methods described herein are based on chirp signal transmission between the nodes and are unique in the following areas:

The chirp signals are able to be used in a way that enables the "disassembly" of the received signal to components that are separated to "LOS" components and multipath generated components.

After the decomposition as described above, the range is able to be calculated only on the LOS signal component.

Bearing is able to be found using three antennas at the locating device on the LOS component only. No triangulation or other infrastructure is needed.

The accuracy of the measurement is able to be highly improved by lengthening the transmitted signal with no effect on the bandwidth of the transmitted signal.

Trip delay measurement—In many other systems, trip delay between units is measured by sending a "time stamp" or equivalent from one unit to the other and then replying within a period of time which must be very accurate (with low variance). Such a method requires very accurate time measurement and very accurate response time. As described herein, the synchronization is based on simple measurements and cancel-out of the time-based differences.

In the algorithm/methods described herein, the trip delay between the units is able to be measured using an algorithm that eliminates the difference of time bases between the units/devices. In that way, the response time start accuracy is not needed and the time measurement accuracy is simply achieved by the de-chirping.

Accordingly, the DF system, device and method described herein has numerous advantages.

The present application has been described in terms of specific embodiments incorporating details to facilitate the understanding of principles of construction and operation of the invention. For example, the amount of implementation using hardware and software is able to be changed, without departing from the spirit of the inventions. Further, such reference herein to specific embodiments and details thereof is not intended to limit the scope of the claims appended hereto. A person skilled in the art would appreciate that various modifications and revisions to system and method for locating items and places. Consequently, the claims should be broadly construed, consistent with the spirit and scope of the invention, and should not be limited to their exact, literal meaning.

What is claimed is:

1. A method of determining a bearing between two or more units in a reflective or non-reflective environment, the method comprising:

receiving a first signal from a first unit at three or more antennas of a second unit such that the second unit inputs a received signal for each of the antennas;

determining the lowest frequency component of each of the received signals;

calculating the phase of the lowest frequency component of each of the received signals; and determining the bearing between the first unit and the second unit based on two or more different pairs of the phases calculated.

2. The method of claim 1, wherein the three or more antennas are positioned in an array at the corners of an equilateral triangle.

3. The method of claim 1, wherein the determining the bearing between the first unit and the second unit based on two or more different pairs of the phases calculated comprises computing a vector sum of the two bearings calculated from each pair of phases.

4. The method of claim 1, wherein the second unit comprises at least one receiver selectively coupled to two or more of the antennas with a first switching element that is coupled to a controller of the second unit.

5. The method of claim 4, further comprising switching which of the two or more antennas are coupled to the receiver with the first switching element based on commands received from the controller such that the receiver serially receives the received signals of each of the two or more antennas through the first switching element.

6. The method of claim 5, wherein the at least one receiver is selectively coupled to at least one signal transformer for each of the two or more antennas with a second switching element that is coupled to the controller.

7. The method of claim 6, further comprising switching which of the signal transformers are coupled to the receiver with the second switching element based on commands received from the controller such that the receiver serially transmits the received signals of each of the two or more antennas through the second switching element to a different one of the signal transformers.

8. The method of claim 7, wherein the controller synchronizes the switching of the first switching element with the switching of the second switching element.

9. The method of claim 8, wherein one or both of the first and second switching elements are implemented with software.

10. The method of claim 8, wherein the controller adjusts the frequency of the switching of the first switching element and the second switching element in order to suppress the switching frequency from affecting the received signals.

11. The method of claim 1, further comprising calculating a vertical component of the bearing by comparing a first altitude value of the first unit measured by an altimeter of the first unit with a second altitude value of the second unit measured by an altimeter of the second unit.

12. The method of claim 1, further comprising displaying the calculated bearing on a display of the second unit.

* * * * *